July 2, 1963   P. KAUNERT ETAL   3,096,156
MULTI-STAGE PROCESS FOR THE SEPARATION AND RECOVERY OF HCN AND H$_2$S
FROM WASTE PRODUCT GASES CONTAINING AMMONIA
Filed April 6, 1960
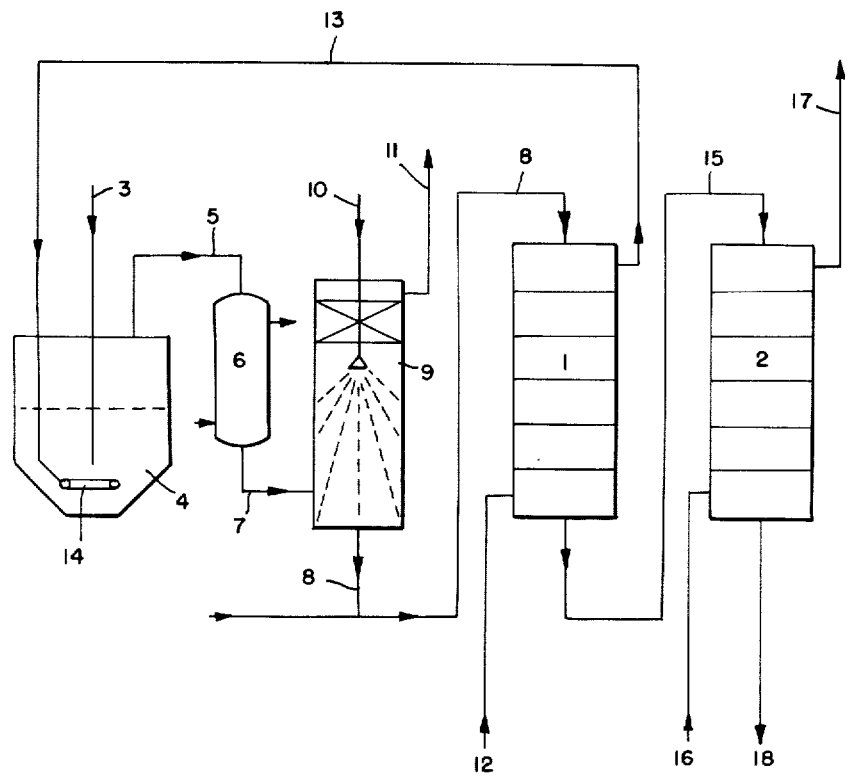
INVENTORS:
PAUL KAUNERT
HASSO DOERING
BY
ATT'YS United States Patent Office 3,096,156
Patented July 2, 1963

3,096,156
MULTI-STAGE PROCESS FOR THE SEPARATION AND RECOVERY OF HCN AND H₂S FROM WASTE PRODUCT GASES CONTAINING AMMONIA
Paul Kaunert and Hasso Doering, Marl, Germany, assignors to Gewerkschaft Auguste Victoria, Marl, Germany
Filed Apr. 6, 1960, Ser. No. 20,389
Claims priority, application Germany Apr. 13, 1959
8 Claims. (Cl. 23—151)

This invention relates to the purification of waste waters, such as occur in coke-oven plants and in plants for the degasification, gasification and cracking of mineral coal, crude oils and similar materials. More specifically, it relates to a method for stripping such waste waters of hydrocyanic acid and hydrogen sulfide contained therein.

Emphasis has recently been laid on the demand for keeping both public waters and the atmosphere clean. This demand chiefly concerns degasification, gasification and cracking plants for mineral coal, crude oils and similar materials. The waste waters obtained in any such plant, when evacuated into public waters are dangerous to the animal and vegetable life therein.

It is known that for example in waters of coke-oven plants the following toxic substances are present: ammonia, hydrogen sulfide, hydrocyanic acid and phenols. While the complete removal of ammonia and phenols does not offer much difficulty, the problem of removing hydrogen sulfide and hydrocyanic acid has not heretofore been satisfactorily solved. Both components pass into the waste water in the course of the usual gas scrubbing processes. For example more than half of the hydrocyanic acid present in coke-oven gas is stripped in the wet removal of hydrogen sulfide, in addition to the hydrogen sulfide, and also in the recovery of ammonia and benzene. Appreciable amounts of hydrocyanic acid are contained above all in the deacidification and stripping vapors from the circulatory-type ammonia and hydrogen sulfide wash usually employed today for the scrubbing of coal distillation gases. Minor amounts also occur in the water discharged from ammonia expelling columns, in the waste water from end stage washers serving for the scrubbing of ammonia remainders and in aqueous condensates from crude benzene stripping columns.

The deacidification and stripping vapors which contain considerable proportions of hydrocyanic acid are led, when using the so-called indirect process for the ammonium sulfate manufacture, through saturators in which the ammonia is combined with sulfuric acid. The effluent vapors, which contain hydrogen sulfide and hydrocyanic acid, are cooled and supplied, for example, to the combustion furnace of a sulfuric acid plant. At the same time, in the direct cooling, the vapors containing hydrogen sulfide and hydrocyanic acid are scrubbed, the whole of the hydrocyanic acid with a small amount of hydrogen sulfide passing into the washing water. The removal of the hydrocyanic acid is necessary to protect the sulfuric acid plant from corrosion. The waste waters thus obtained containing hydrogen sulfide and hydrocyanic acid have hitherto in general been discorded without further treatment, a course which can no longer be permitted by reason of the pollution of streams and rivers which is increasing to threatening degree.

It is true that distillative methods for the removal of hydrogen sulfide and hydrocyanic acid from industrial waste waters have in principle been known, but all of these methods such disadvantages that they could not be accepted in practice. The reasons for this are as follows:

The distillative stripping of hydrogen sulfide and hydrocyanic acid, in particular by reason of the water occurring in large amounts with only small concentration, requires a considerable consumption of energy which as a rule is covered by feeding steam to the stripping column. In some descriptions of the process there is found the intimation that the steam consumption can be considerably reduced by transferring the heat content of hot media from other sources to the waste water to be stripped by heat exchangers. This of of course overlooks the fact that in modern plants all available possibilities of heat exchange are already utilized and consequently the proposal to diminish the stream consumption of distillative stripping of waste water by heat exchange only results in a shifting of the cost to other points of the plant.

The mere distillative stripping of waste waters without the recovery of hydrogen sulfide and hydrocyanic acid, i.e., the discharge of the impurities from the aqueous phase into the ambient air, is after all to be rejected. Such methods merely shift the water and air pollution problem from the water side to the air side. For the same reason, all those methods of waste water purification are to be rejected in which water containing hydrogen sulfide and hydrocyanic acid is delivered to natural draught or fan cooler towers. Apart from the fact that only part of the substances contained in the water can be removed in this way, the pollution of the air with the injurious substances discharged is intolerable.

Conventional distillative methods, which provide for the stripped-off hydrocyanic acid being recovered have the disadvantage, in addition to requiring high cost of energy, that hydrogen sulfide remains in the waste water so that for the complete purification further expensive measures are necessary.

Within the compass of quite different problems in which the recovery of hydrocyanic acid and not the purification of coke-oven or other industrial waste waters has been aimed at, attempts have been made to strip hydrocyanic acid from solutions with air or other gases. The methods based on this technique have not influenced the problem of purifying industrial waste waters and exhibit at least for this problem considerable defects. With such measures the selectivity as regards hydrogen sulfide and hydrocyanic acid is not satisfactory so that the recovery of pure hydrocyanic acid is rendered difficult. In order to be able to work selectively to some extent it would be necessary that relatively large amounts of hydrogen sulfide should be retained in the water, which apart from the waste of hydrogen sulfide and hydrocyanic acid, is not permissilble with regard to the desired purity of the waste water and for the removal of the remainders of hydrogen sulfide from the waters containing hydrocyanic acid the use of chemicals by which the hydrogen sulfide is bound would be necessary. This would result in a further contamination of the waste waters. In a similar manner the addition of acids usually made to acidify the waste water prior to its aeration in one of the conventional aeration processes has the undesirable effect that apart from the consumption of acid with only a trivially increased selectivity, neutralizing agents, as for example lime, must be added before the evacuation of the waste waters into public waters.

The present invention has for its object a multistage process for stripping waste waters, such as occur in coke-oven plants and in degasification, gasification or cracking plants for mineral coal, crude oils and similar materials from hydrocyanic acid and hydrogen sulfide in a practially complete manner so that no objection can be raised to discharging the waste waters into public waters. At the same time full account is taken of the demands for keeping the atmosphere pure in that both hydrogen sulfide and hydrocyanic acid are completely recovered and put to an economical use. It is therefore a special object of the invention to separate the hydrocyanic acid from the waste water selectively in such a manner that it can be recovered in separate plants operating according to conventional methods, in the form of pure liquid hydrocyanic acid or for example as potassium or sodium cyanide. A further object is to separate the hydrogen sulfide, which greatly complicates and seriously interferes with the production of pure liquid hydrocyanic acid or the processing of gaseous hydrocyanic acid for example into potassium or sodium cyanides, from the hydrocyanic acid completely and to feed it to the combustion furnace of a plant for the production of sulfur or sulfuric acid.

The invention relates to a process for removing hydrogen sulfide and hydrocyanic acid practically completely from coke-oven and similar waste waters which occur immediately for example in the wet cleaning of gas or are obtained by cooling or washing vapors containing hydrocyanic acid and hydrogen sulfide by means of water.

The invention is characterized by the fact that the waste water is treated in a plurality of stages with gases which are practically inert to hydrocyanic acid, such as air, in a manner known per se, the whole of the hydrogen sulfide and part of the hydrocyanic acid being stripped by the treatment gases in the first process stage and the bulk of the hydrocyanic acid being stripped in a second process stage, and by the fact that the stripped-off gas leaving the first stage which is enriched mainly with hydrogen sulfide and contains minor amounts of hydrocyanic acid is supplied to the saturator of a standard-type ammonium sulfate production plant instead of the usual agitating air for the thorough mixing of the acid bath in the said saturator. Both the first and/or the second stage of the process according to this invention can also be carried out in a plurality of steps. The preferred procedure in accordance with this invention is to treat the water containing hydrocyanic acid and hydrogen sulfide with the gas which is practically inert to hydrocyanic acid and hydrogen sulfide in continuously operating packed columns, bubble-tray columns, multistage spraying columns without insertions, or columns based on similar working principles and to strip the hydrocyanic acid and hydrogen sulfide preferably in only two process stages.

The water from the first process stage which is practically free of hydrogen sulfide but still contains hydrocyanic acid drains into the sump of the column or columns in the first process stage and thence is supplied, depending on the given structural and apparatus conditions, either to one or more separate columns or to the lower part of a correspondingly high column of which the upper part serves for carrying out the first process stage and which is separated from the lower part as far as the supply to the inert gas to the lower and the upper part of the column is concerned and likewise stripped therein by means of a gas practically inert to hydrocyanic acid, preferably by air. The hydrocyanic acid which is thus practically completely passed into the stripping air can be processed by conventional methods into pure liquid hydrocyanic acid or for example to sodium or potassium cyanide. The stripping air which is then free again of hydrocyanic acid can be recycled to the second process stage or stages.

The recirculation of the air containing hydrogen sulfide and hydrocyanic acid from the first process stage into the saturator has the advantage that the stripped off hydrogen sulfide and the proportion of hydrocyanic acid entrained by the said stripped-off hydrogen sulfide are again supplied to the production stream and therefore not lost for the recovery. The fact that no pollution of the atmosphere occurs is the decisive factor of this processing technique. The vapors leaving the saturator, for example in the indirect process, including the air containing hydrogen sulfide and hydrocyanic acid from the first process stage, are cooled in conventional manner by a heat exchanger and then directly washed with water with simultaneous cooling. In this way the whole of the hydrocyanic acid and a small amount of hydrogen sulfide pass into the washing water, whereas the bulk of the hydrogen sulfide is led free of hydrocyanic acid to the combustion furnace of a sulfur or sulfuric acid plant. By the constant circulation between the first stage and the saturator, there very quickly is set up an equilibrium as regards the amounts of hydrocyanic acid and hydrogen sulfide contained in the waste waters.

The idea inherent in the present invention is substantially based on the discovery that hydrogen sulfide can be completely stripped from waste waters in a first process stage by a mild aeration, i.e. with relatively small amounts of air and at a temperature of about 30° to 40° C. at which the waste waters normally occur. In contrast to other methods, it is immaterial whether or not major quantities of hydrocyanic acid are also stripped in the first process stage. For example, the amount of hydrocyanic acid stripped may be 50% of the amount originally present in the waste water without the efficiency and economy of the process according to this invention being questioned. It is this fact that no necessity exists with the process according to this invention to keep the hydrocyanic acid discharge extremely low in the first process stage, which makes it possible to operate with such an excess of air in the first process stage that all of the hydrogen sulfide is certain to be removed from the waste water. In a stripping column operated in this way, the attendance and supervision is considerably simpler than in a process in which attention must constantly be given that a maximum of hydrogen sulfide is removed with a minimum loss of hydrocyanic acid.

To increase the selective stripping effect in a two stage process, the stripping in the first stage can be carried out stepwise by supplying fresh air to the stripping column at two or more levels and discharging the air mainly enriched with hydrogen sulfide a short distance below the next level at which fresh air is fed in.

Summarizing, the invention thus achieves the following advantages:

The complete removal of hydrogen sulfide and hydrocyanic acid from waste waters so that the purified waste water can be evacuated without risk into public waters;

No pollution of the atmosphere by hydrogen sulfide or hydrocyanic acid due to the fact that the vapors stripped in the first process stage are recycled into the saturator to be used, instead of the usual agitating air, as a means for agitating the ammonium salt crystals in the saturator bath;

The economical utilization of the entire amount of hydrocyanic acid and hydrogen sulfide present in the waste water by the selective separation of the two components and the possibility of processing the hydrocyanic acid component into pure liquid hydrocyanic acid or for example sodium or potassium cyanide, and oxidizing the hydrogen sulfide to sulfur or sulfuric acid;

No heat requirement for the process according to the invention, no acidification of the waste waters prior to stripping and no neutralization after stripping, no addition of agents binding hydrogen sulfide for the removal of remainders of hydrogen sulfide, hence no consumption of chemicals;

Running energy costs merely for feeding the waste water to the stripping columns and for the supply or circulation of the air in the second process stage.

The invention will now be described in greater detail with reference to the accompanying drawing by way of example, but the invention is not restricted to this example.

*Example*

The drawing shows diagrammatically a plant for carrying out the process according to this invention.

Vapors originating from the deacidification and stripping columns of a wet desulfurization and ammonia production plant are fed in known manner, at a temperature of 94° C. and a pressure of 875 mm. Hg, through an inlet pipe 3 into a saturator 4, which contains a sulfuric acid bath of about 2 to 3% strength. The quantity of vapors fed in amounts to 820 cubic meters (NTP) per hour. The concentrations in hydrogen sulfide and hydrocyanic acid which are of interest within the scope of this invention are 400 grams of $H_2S$ per cubic meter (NTP) corresponding to 328 kilograms of $H_2S$ per hour, and 16.2 grams of HCN per cubic meter (NTP) corresponding to 13.3 kilograms of HCN per hour. In the saturator 4 the ammonia contained in the vapors is combined with sulfuric acid to form ammonium sulfate. Since the reaction proceeds exothermically, the temperature in the saturator bath rises to 96° C. For the thorough agitation of the bath there are supplied to the saturator through line 13 and an annular rose 14, instead of the usual agitation air, 286 cubic meters (NTP) per hour of a stripping air containing 20.6 grams of $H_2S$ per cubic meter (NTP) corresponding to 5.9 kilograms of $H_2S$ per hour and 11.2 grams of HCN per cubic meter (NTP) corresponding to 3.2 kilograms of HCN per hour, from a bubble-tray column 1 of the first process stage. In the saturator the ammonia contained in the vapors is completely combined with sulfuric acid. 700 cubic meters (NTP) per hour of vapors leave the saturator 4 through line 5 at a temperature of 96° C. and a pressure of 760 mm. Hg. The vapors leaving the saturator contain 477 grams of $H_2S$ per cubic meter (NTP) corresponding to 334 kilograms of $H_2S$ per hour and 23.6 grams of HCN per cubic meter (NTP) corresponding to 16.5 kilograms of HCN per hour. Since the water vapor partial pressure in the vapors above the sulfuric acid bath liquid saturated with ammonium sulfate is about 90% of the vapor pressure above pure water, the vapors leaving the saturator entrain about 2,000 kilograms of water vapor per hour. The vapors are cooled consecutively in a heat exchanger 6 and a direct cooler 9. The vapors which leave the heat exchanger 6 at a temperature of 72° C. are led through line 7 with the water vapor condensed in the heat exchanger 6 into the direct cooler 9 which is fed through a feed pipe 10 with 12 cubic meters of water per hour having a temperature of 22° C. The water supplied through line 10 to the direct cooler 9 strips the hydrocyanic acid completely and the hydrogen sulfide to a small extent with reference to the total concentration of hydrogen sulfide in the vapor. The vapors which are free of hydrocyanic acid and enriched with hydrogen sulfide are fed through line 11 at a temperature of 32° C. to a sulfuric acid plant (not shown) and processed to sulfuric acid. These vapors contain 473 grams of $H_2S$ per cubic meter (NTP) corresponding to 328 kilograms of $H_2S$ per hour, given a quantity of vapor of 694 cubic meters (NTP) per hour. The 14 cubic meters of water per hour flowing from the direct cooler 9 and composed of 12 cubic meters per hour of water fed in at 10 and 2 cubic meters per hour of water vapor condensate from line 5, have a mixing temperature of 41° C. The water discharged, which contains 422 milligrams of $H_2S$ per liter corresponding to 5.9 kilograms of $H_2S$ per hour and 1,180 milligrams of HCN per liter corresponding to 16.5 kilograms of HCN per hour, is led through line 8, which also serves to feed in washing waters or condensates containing hydrocyanic acid and minor amounts of hydrogen sulfide, coming from other operations, into the bubble-tray column 1. 280 cubic meters (NTP) per hour of air are fed through line 12 and passed in countercurrent through column 1. In this way, practically the whole of the hydrogen sulfide, down to 0.8 milligram of $H_2S$ per liter (corresponding to 11 grams of $H_2S$ per hour), passes from the water into the stripping air, i.e. 99.8% of the hydrogen sulfide contained in the water fed into column 1 is stripped. At the same time, the said water only gives off 19.4% of the hydrocyanic acid content to the stripping air. The air containing hydrogen sulfide and hydrocyanic acid which leaves at the top of column 1 is fed, as described above, through line 13 into the saturator 4. The water drained from column 1 at a temperature of 40° C., still contains, besides a trivial residual amount of 0.8 milligram of $H_2S$ per liter, 80.6% of the hydrocyanic acid present in the feed water. The hydrocyanic acid concentration in the water drained from column 1 amounts to 950 milligrams of HCN per liter which corresponds to 13.3 kilograms of HCN per hour given an unchanged drainage of 14 cubic meters of water per hour.

The amount of air required in the first process stage depends, inter alia, on the amount of hydrogen sulfide contained in the water. In general 20 to 50 cubic meters (NTP) of air per cubic meter of water supplied are sufficient for the complete removal of the hydrogen sulfide therefrom. In the above example, a ratio of air to water of 20:1 is assumed.

In the second process stage, the water leaving the column practically free of hydrogen sulfide is fed through line 15 to the bubble-tray column 2. The stripping air enters the lower part of column 2, becomes enriched with hydrocyanic acid and leaves overhead through line 17. The amount of air blown in is 2,400 cubic meters (NTP) per hour. On flowing through column 2, about 11 cubic meters (NTP) of HCN per hour pass into the stripping air. From the sump of column 2 the water is drained at 38° C. with a negligible hydrocyanic acid concentration of 5.4 milligrams of HCN per liter corresponding to 75 grams of HCN per hour, i.e. 99.4% of the hydrocyanic acid contained in the water fed into column 2 is stripped in the second process stage. The effluent water also contains 0.7 milligram of $H_2S$ per liter; this means that the extremely small amount of hydrogen sulfide left in the water discharged from the first process stage is not stripped in the second process stage either. Consequently the stripping air enriched with hydrocyanic acid which leaves through line 17 is entirely free from hydrogen sulfide.

The water leaving column 2 is fed through line 18 to a main canal or to the sewage system, but can also be used partly or wholly as cooling water in the direct cooler 9. The air required in the second process stage ranges from 100 to 200 cubic meters (NTP) per cubic meter of water depending on the hydrocyanic acid concentrations in the feed water and on the manner of operation and the design of the column 2. In the above example the ratio of air to water is about 170:1.

The hydrocyanic acid contained in the stripping air, free of hydrogen sulfide, of the second process stage which leaves through line 17 can be processed by conventional methods into pure liquid hydrocyanic acid or for example sodium or potassium cyanide. The hydrocyanic acid having thus been removed again from the stripping air of the second process stage, the completely clean stripping air is either released into the atmosphere or recycled and reused as stripping air in the second process stage.

We claim:

1. A multi-stage process for the separation and recovery of HCN and $H_2S$ from a waste product gas which also contains ammonia, said process comprising: introducing said waste product gas into a saturator; contacting said waste product gas in said saturator with a dilute sulfuric acid bath at an elevated temperature for removal of said ammonia as ammonium sulfate; removing from said saturator a gas which is substantially free of ammonia but which still contains said HCN and $H_2S$; cooling said gas from said saturator; absorbing substantially all of the HCN and a portion of the $H_2S$ contained in said gas from said saturator by contact with water in a washing zone recovering from said washing zone the washed product gas steam enriched in $H_2S$ and substantially free of HCN; leading the wash water containing HCN and $H_2S$ into a first stripping zone wherein substantially all of said $H_2S$ and a minor proportion of said HCN is stripped from said wash water by contact with a stripping gas which is practically inert to HCN; recycling and introducing the effluent stripping gas from said first stripping zone into said saturator; leading the partially stripped water from said first stripping zone into a second stripping zone wherein substantially all of the remaining HCN is stripped from the wash water by contact with a second stripping gas which is practically inert to HCN; and separating HCN from the gas stream being removed from said second stripping zone.

2. A process as claimed in claim 1 wherein the stripping gas in each of said stripping zones is air.

3. A process as claimed in claim 1 wherein the stripping gas from said first stripping zone is recycled and introduced into said saturator and the acid bath in said saturator is agitated by the recycled gas stream.

4. A process as claimed in claim 1 wherein said first stripping zone is divided into a plurality of stripping steps, fresh stripping gas being introduced into each step and the gas enriched with $H_2S$ being removed just prior to the next succeding step, all of the gas removed from each step of said first stripping zone recycled and introduced into said saturator.

5. A process as claimed in claim 1 wherein HCN is separated from the gas stream being removed from said second stripping zone as substantially pure liquid hydrocyanic acid.

6. A process as claimed in claim 1 wherein HCN is separated from the gas stream being removed from said second stripping zone as sodium cyanide.

7. A process as claimed in claim 1 wherein HCN is separated from the gas stream being removed from said second stripping zone as potassium cyanide.

8. A process as claimed in claim 1 wherein water substantially free of HCN and $H_2S$ is recovered from said second stripping zone and at least a portion thereof recycled to wash the gas removed from said saturator.

References Cited in the file of this patent

UNITED STATES PATENTS

| | | |
|---|---|---|
| 1,742,505 | Haun | Jan. 7, 1930 |
| 2,110,244 | Schreiber | Mar. 8, 1938 |
| 2,143,821 | Sperr | Jan. 10, 1939 |

UNITED STATES PATENT OFFICE
CERTIFICATE OF CORRECTION

Patent No. 3,096,156 July 2, 1963

Paul Kaunert et al.

It is hereby certified that error appears in the above numbered patent requiring correction and that the said Letters Patent should read as corrected below.

Column 1, line 60, for "discorded" read -- discarded --; line 63, after "to" insert -- a --; line 67, after "methods" insert -- have --; column 2, line 6, strike out "of", second occurrence; line 46, for "permissilble" read -- permissible --; column 6, line 11, after "column" insert -- 1 --.

Signed and sealed this 11th day of February 1964.

(SEAL)
Attest:

ERNEST W. SWIDER
Attesting Officer

EDWIN L. REYNOLDS
Acting Commissioner of Patents